C. H. REAMES.
TROLLEY CATCHER.
APPLICATION FILED MAR. 11, 1911.
1,038,437.
Patented Sept. 10, 1912.
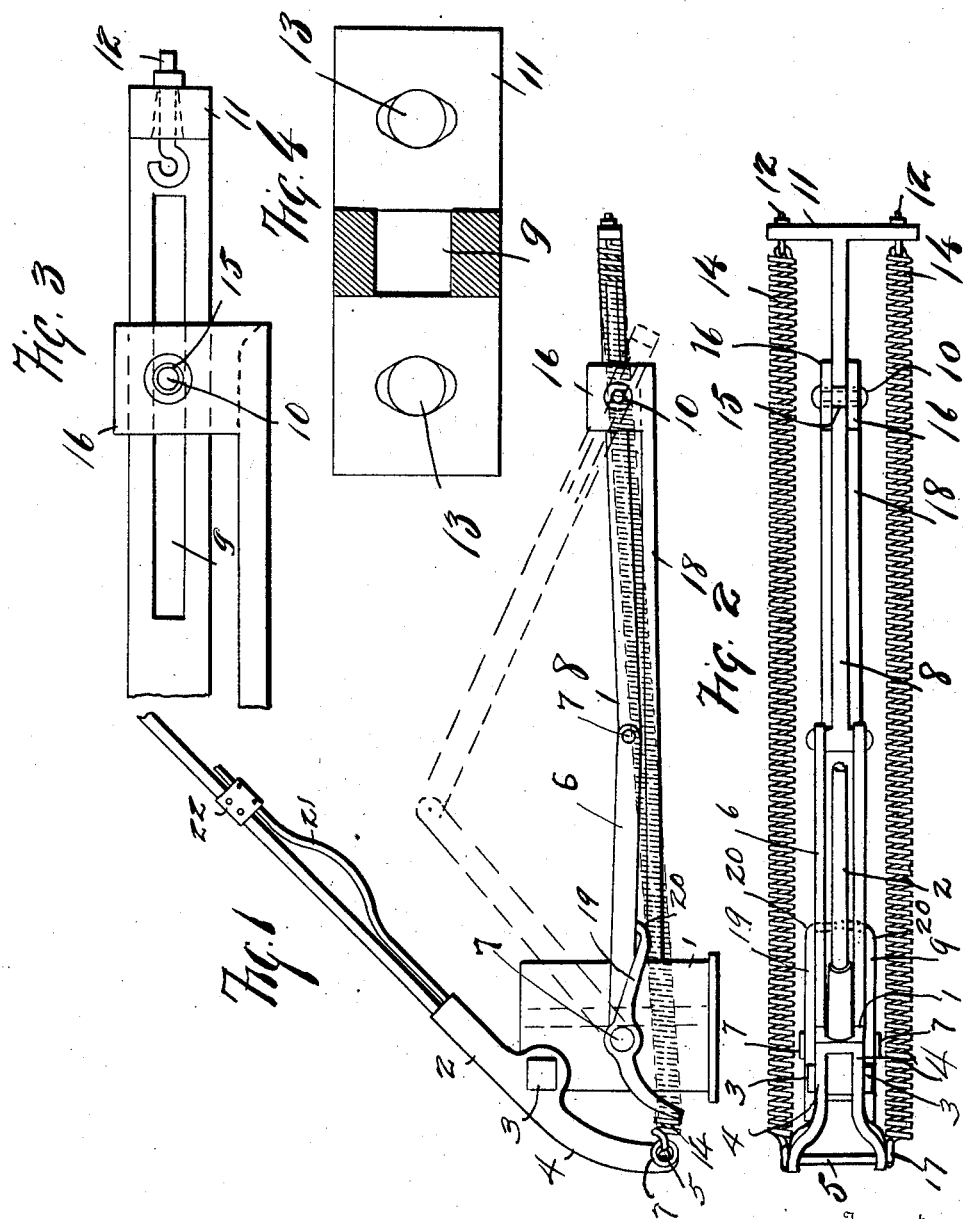

UNITED STATES PATENT OFFICE.

CHARLES H. REAMES, OF FORT WORTH, TEXAS, ASSIGNOR OF ONE-FOURTH TO DAN TUBBS AND ONE-FOURTH TO ROY HILL, BOTH OF FORT WORTH, TEXAS.

TROLLEY-CATCHER.

1,038,437. Specification of Letters Patent. Patented Sept. 10, 1912.

Application filed March 11, 1911. Serial No. 613,873.

*To all whom it may concern:*

Be it known that I, CHARLES H. REAMES, citizen of the United States, residing at Fort Worth, in the county of Tarrant and State of Texas, have invented certain new and useful Improvements in Trolley-Catchers, of which the following is a specification.

This invention relates to trolley poles for electric cars, and more particularly to the connection of the trolley pole to the trolley stand, and the object is to provide simple and inexpensive devices for tripping the trolley pole by automatically releasing the tension of the maintaining springs which hold the trolley pole in operative position, so that the trolley pole will drop downwardly shortly after it is displaced from under the trolley wheel and not rise up and break the suspension devices.

Other objects and advantages will be fully explained in the following description and the invention will be more particularly pointed out in the claim.

Reference is had to the accompanying drawings which form a part of this application and specification.

Figure 1 is a side elevation of the trolley pole mounted, but partly broken, showing the improved tripping devices. Fig. 2 is a plan view of the same. Fig. 3 is an enlarged broken detail view of the sliding bearing for the sliding toggle arm. Fig. 4 is an enlarged section of the sliding toggle arm, showing the spring connections.

Similar characters of reference are used to indicate the same parts throughout the several views.

The improved stand is provided with a socket 1 on which is pivotally mounted the trolley pole 2 by means of a pivot bolt 3. The pole 2 has two prongs 4 which engage the bolt 3 on opposite sides of the socket 1 and which carry a tripping bar 5. Double toggle arms 6 are pivotally mounted on the socket 1 by a bolt 7 and are pivotally connected to the single toggle arm 8. The arm 8 has a slot 9 therein for a bolt 10 on which the arm 8 slides. The arm 8 carries a head 11 which has two holes 13 therethrough for the stud bolts 12. The holes 13 are funnel shaped, as shown in Fig. 4 and also by dotted outline in Fig. 3 so that the springs 14 will not be bent upwardly when the toggle arms 8 and 6 are thrown to the position of the dotted outline in Fig. 1. An antifriction roller 15 is placed on the bearing bolt 10 to prevent friction when the arm 8 is sliding through the bearing studs 16. Tension springs 14 are attached to the ends of the tripping bar 5 by means of rings 17 and are attached to the head 11 by means of the stud bolts 12. These springs hold the trolley pole in operative position. The tension of these springs is maintained by the toggle arms 8 and 6 as long as the pivotal connection of these arms is below the dead center, as shown in Fig. 1. The arm 18 which is rigid with the socket 1 carries the bearing arms 16 and thus supports the toggle arms 6 and 8 in operative position. Trips 19 are pivoted on the bar or pivot bolt 7 and extend backwardly in the path of the tripping bar 5 and extend forwardly with tips 20 turned under the arms 6. The tips 20 will lift the arms 6 high enough to pass the dead center, and as soon as the pivotal connection of the toggle arms pass the dead center the springs 14 will force the arms 6 and 8 to the position of the dotted outline.

The operation will be as follows. When the trolley pole leaves the trolley wire, the upper end of the pole will be thrown upwardly by the springs 14 and the bar 5 will strike the trips 19. The trips will start the toggle arms upwardly and the springs 14 will force the arms on upwardly. The head 12 will move toward the bearing arms 16 and the springs 14 will then lose their tension and the trolley pole will immediately fall, the spring 21 falling on the toggle arms 6 and 8 to prevent pounding of the trolley pole.

The spring 21 is attached rigidly at the lower end to the trolley pole and is slidable through the collar 22.

Having fully described my invention, what I claim as new and desire to secure by Letters Patent, is,—

An automatic trip for trolley poles comprising a single piece socket, a trolley pole pivoted on the upper front part of said socket and provided with a forked extension down in front of said socket, a tripping bar carried by the arms of said forked extension and projecting through both arms, a rearward extending bar rigid with said socket, bearing arms thereon, a pivot bolt projecting through said socket, toggle arms consisting of two bars pivotally mounted on said pivot bolt and a single bar pivotally connected to said two bars at one end and having a slot therein and extending between said bearing arms, a bearing bolt projected through said slot and carried by said arms, a cross-head carried by said single bar, tension springs attached to the ends of said tripping bar, stud bolts loosely mounted in said cross-head and connected to said springs, trips pivotally mounted on said pivot bolt and having their forward ends hanging in the path of said tripping bar and their rear ends curved and projecting under said two toggle arm bars, and a cushioning spring attached to said trolley pole and adapted to fall on said toggle arms.

In testimony whereof, I set my hand in the presence of two witnesses, this 28th day of February, 1911.

CHARLES H. REAMES.

Witnesses:
A. L. JACKSON,
J. W. STITT.